UNITED STATES PATENT OFFICE.

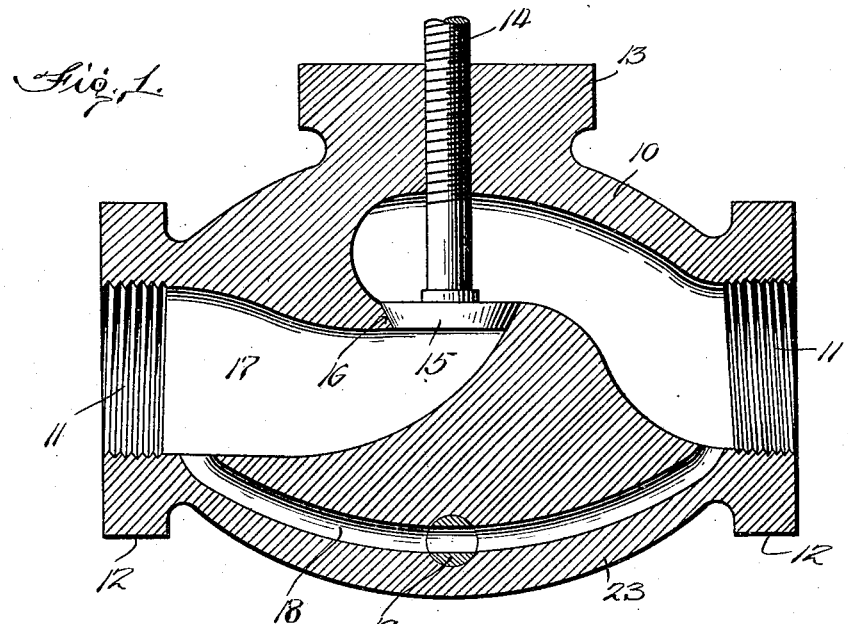
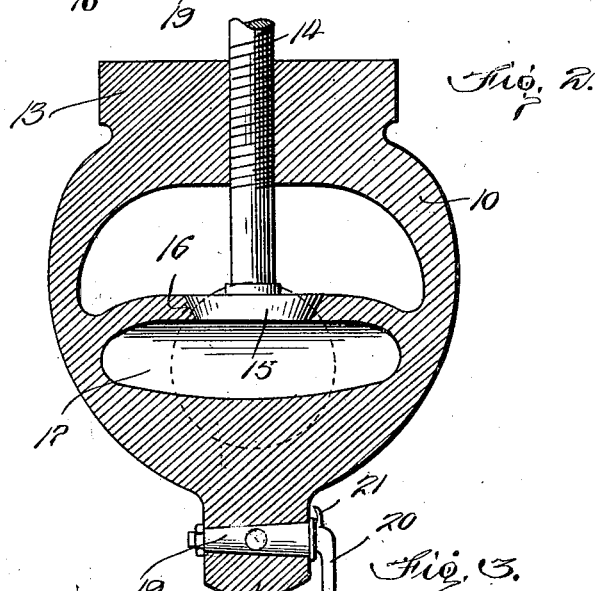
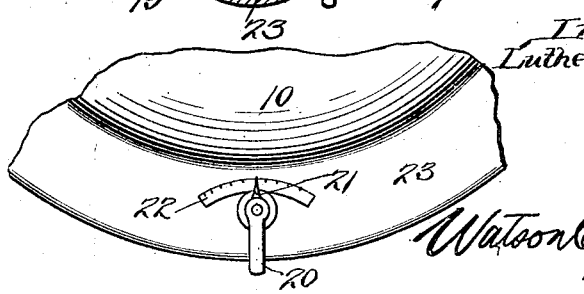

LUTHER E. ERWIN, OF COVINGTON, OKLAHOMA.

GAS-CONTROLLING VALVE.

1,394,615.  Specification of Letters Patent.  Patented Oct. 25, 1921.

Application filed April 2, 1921. Serial No. 457,940.

*To all whom it may concern:*

Be it known that I, LUTHER E. ERWIN, a citizen of the United States, residing at Covington, in the county of Garfield and State of Oklahoma, have invented certain new and useful Improvements in Gas-Controlling Valves, of which the following is a specification, reference being had to the accompanying drawings.

This invention relates to valves, and particularly to such valves as are used on internal combustion engines and for regulating high pressure gas.

The general object of the invention is to provide a valve so constructed that the main body of gas may be cut off from an engine, for instance, but a small amount of gas be permitted to pass to the engine so that the engine may run idle.

A further object is to provide means whereby the amount of gas passing from the engine through the by-pass may be regulated.

My invention is illustrated in the accompanying drawings, wherein:—

Figure 1 is a vertical sectional view of a valve constructed in accordance with my invention;

Fig. 2 is a transverse sectional view thereof;

Fig. 3 is a fragmentary side elevation showing the valve handle 20 and the scale 22.

Referring to these drawings, 10 designates the body of the valve formed at its ends with internal screw-threads 11 and with many-sided heads 12 permitting the application of a wrench. The valve body is provided with a bonnet 13 through which passes a screw 14 carrying a valve 15 at its lower end, the valve being shown as beveled. The interior of the valve body is formed to provide a seat 16 with which this valve 15 coacts so that when the valve 15 is closed on its seat, passage of gas through the main passageway 17 of the valve body cannot occur.

Also formed in the valve body is a by-pass duct 18 which opens into the passage 17 on both sides of the valve seat 16. Controlling passage through this duct is a rotatable valve 19 of any suitable or usual construction and provided with an exterior handle 20 whereby it may be manipulated. Preferably the axially extended body of the valve 19 is provided with a pointer 21 operating over a scale 22. This gas cock or valve is tapering in form and may be held in frictional engagement in the seat in the usual manner so that the valve will remain in its adjusted position after being set.

In the use of this device, the valve 15 is fully opened and the gas passes through the valve body and along the feed pipe of the engine or along any feed pipe to which it is attached. When the valve 15 is closed, however, a small amount of gas will pass through the by-pass duct 18 to the engine. This amount is regulated by shifting the valve 19 to bring its ports into more or less coincidence with the ports of the valve casing 23 in which the valve is disposed.

While this valve is particularly designed for permitting the idling of gas engines, internal combustion engines and engines of the same character, yet it will be understood that it might be used in many different situations and is particularly adapted for controlling the passage of gas under high pressure.

Of course, it will be understood that the stem 14 may be provided with any suitable handle whereby it may be rotated, as for instance a wheel, as in the ordinary form of globe valve.

I claim:—

A valve body of the character described having a longitudinally extending passage formed at its middle to provide an upwardly facing seat, there being a duct formed in the valve body inward of the outer face of the valve body and extending beneath the seat and opening into the passage adjacent the opposite ends of the passage and on opposite sides of the seat, the duct being bowed away from said seat, a valve having a screw-threaded stem extending through the valve body whereby the valve may be raised and lowered, and a rotatable valve extending through the valve body and intersecting the by-pass duct and having a diametrically extending bore, the rotatable valve having an exterior handle and a pointer, the duct being of less diameter than the diameter of the passage extending through the valve body.

In testimony whereof I hereunto affix my signature.

LUTHER E. ERWIN.